United States Patent
Lee

(10) Patent No.: US 9,316,817 B2
(45) Date of Patent: Apr. 19, 2016

(54) SIX-PIECE LENS ASSEMBLY FOR CAPTURING IMAGES

(71) Applicant: ABILITY OPTO-ELECTRONICS TECHNOLOGY CO., LTD., Taichung (TW)

(72) Inventor: Hung-Wen Lee, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 14/611,567

(22) Filed: Feb. 2, 2015

(65) Prior Publication Data

US 2016/0018627 A1   Jan. 21, 2016

(30) Foreign Application Priority Data

Jul. 16, 2014 (TW) .............................. 103124346 A

(51) Int. Cl.
  *G02B 13/18* (2006.01)
  *G02B 9/60* (2006.01)
  *G02B 13/00* (2006.01)
  *G02B 9/62* (2006.01)

(52) U.S. Cl.
  CPC .............. *G02B 13/0045* (2013.01); *G02B 9/62* (2013.01)

(58) Field of Classification Search
  USPC ........................................ 359/708–719, 764
  See application file for complete search history.

(56) References Cited

U.S. PATENT DOCUMENTS

| 9,030,764 B2 * | 5/2015 | Asami | ................... | G02B 13/06 359/713 |
| 2012/0314301 A1* | 12/2012 | Huang | ............... | G02B 13/0045 359/713 |
| 2013/0033762 A1 | 2/2013 | Tsai et al. | | |

FOREIGN PATENT DOCUMENTS

| JP | 2014-44373 A | 3/2014 |
| JP | 2014-115431 A | 6/2014 |
| TW | 201300824 A1 | 1/2013 |
| TW | 201333575 A | 8/2013 |
| TW | 201418759 A | 5/2014 |

* cited by examiner

*Primary Examiner* — Mohammed Hasan
(74) *Attorney, Agent, or Firm* — Muncy, Geissler, Olds & Lowe, P.C.

(57) ABSTRACT

A six-piece lens assembly for capturing images is provided, which comprises an optical lens, an aperture stop, and an image-plane. The optical lens comprises six lenses as below. A first lens with positive refractive power has a convex image-side surface. A second lens with negative refractive power has a convex object-side surface. A third lens with refractive power has a concave image-side surface. A fourth lens has the refractive power. A fifth lens has a convex image-side surface and a convex object-side surface and a sixth lens has a concave image-side and a concave object-side surface. At least one of the object-side surface and the image-side surface of the second lens and the fourth lens are aspheric. At least one of the object-side surface and the image-side surface of the third lens, the fifth lens, and the sixth lens have at least one an inflection points.

19 Claims, 10 Drawing Sheets

SIX-PIECE LENS ASSEMBLY FOR CAPTURING IMAGES

CROSS-REFERENCE TO RELATED APPLICATION

This application claims priority from Taiwan Patent Application No. 103124346, filed on Jul. 16, 2014, in the Taiwan Intellectual Property Office, the content of which are hereby incorporated by reference in their entirety for all purposes.

BACKGROUND OF THE INVENTION

1. Field of the Invention

The following description relates to a six-piece optical lens assembly for capturing images, and more particularly with respect to a six-piece optical lens assembly for capturing images having high image quality comprised of a six-piece optical lens and is applicable to be applied to 3C products.

2. Description of the Related Art

Currently, optical lenses for capturing images are usually disposed in digital gadgets, such as cell phones, game consoles, PC CAM, DSC or DVD and so on, for capturing image of object, and as miniaturization and lower cost of optical lenses for capturing image have become a trend, capability of optical aberration correction, high resolution and high imaging quality are necessary gradually.

As the conventional spherical polishing glass lenses, which are of more choices, and the glass lenses are advantageous to chromatic aberration correction have been widely-used in the field, when smaller F Number and larger Wide-angle are applied to the spherical polishing glass lenses, it becomes harder to correct the optical aberration, such as spherical aberration. In order to improve the shortcomings of the aforementioned traditional spherical polishing glass lenses, the current image capturing devices have used aspheric plastic lens or aspheric molding glass lens to acquire better imaging quality; nonetheless, structure of the preceding optical module for capturing images normally needs combination of more lenses so as to have better optical performance which results that the whole optical module for capturing image is oversized. Consequently, the assembly is incapable of downsizing and having lower cost, for failing to meet the demand of miniaturization for electronic products.

As a result, how to reduce the total length of optical lens for capturing image and effectively combine sets of lenses so as to further promote the imaging quality has become an extremely crucial issue.

SUMMARY OF THE INVENTION

The aspect of embodiment of the present invention aims to a six-piece optical lens assembly for capturing images which uses combination of refractive power, convex and concave surfaces to further shorten total length of optical lens for capturing images so as to increase imaging quality and is able to be applied to minimized electronic products.

According to the aforementioned technical problems, the present invention may provide a six-piece lens assembly for capturing images which may comprise: an optical lens for capturing images, in order from an object-side toward an image-side along an optical axis comprising: a first lens element with positive refractive power having a convex image-side surface near the optical axis; a second lens element with negative refractive power having a convex object-side surface near the optical axis, and at least one of the object-side and an image-side surfaces of the second lens element being aspheric; a third lens element with refractive power having a concave image-side surface near the optical axis, and at least one of an object-side and the image-side surfaces of the third lens element having at least one inflection point; a fourth lens element with refractive power near the optical axis, and at least one of an object-side and an image-side surfaces of the fourth lens element being aspheric; a fifth lens element having a convex image-side surface and a convex object-side surface near the optical axis, and at least one of the object-side and the image-side surfaces of the fifth lens element having at least one inflection point; and a sixth lens element having a concave image-side surface and a concave object-side surface near the optical axis, and at least one of the object-side and the image-side surfaces of the sixth lens element having at least one inflection point; an image-plane for imaging an object to be imaged; and an aperture stop disposed between the object and the first lens element; wherein a distance from the object-side surface of the first lens element to the image-side surface of the sixth lens element may be OL, and an entrance pupil diameter of the six-piece lens assembly for capturing images may be EPD, and the aforementioned parameters may be satisfied with the following relationship: $1.5<OL/EPD<2.5$, and an absolute value of a focal length of at least two of the six lens elements may be less than 5 mm.

Preferably, an Abbe number of the second lens element may be vd2, and the following relationship may be satisfied: $vd2<=30$.

Preferably, a distance from the image-side surface of the second lens element to the object-side surface of the third lens element on the optical axis may be D23, a distance from the image-side surface of the fourth lens element to the object-side surface of the fifth lens element on the optical axis may be D45, and the following relationship may be satisfied: $3.5<D23/D45<10$.

Preferably, a distance from the object-side surface of the first lens element to the image-plane on the optical axis may be TL, a curvature radius of the object-side surface of the first lens element may be R1, and the following relationship may be satisfied: $1<TL/R1<2.5$.

Preferably, a distance from the image-side surface of the first lens element to the object-side surface of the second lens element on the optical axis may be D12, a focal length of the first lens element may be f1, and the following relationship may be satisfied: $0.015<D12/f1<0.04$.

Preferably, a sum of a central thickness of the six lens elements may be $\Sigma(CT)$, a focal length of the optical lens for capturing images may be f, and the following relationship may be satisfied: $0.6<\Sigma(CT)/f<1$.

Preferably, a curvature radius of the image-side surface of the first lens element may be R2, a curvature radius of the object-side surface of the second lens element may be R3, a curvature radius of the image-side surface of the fifth lens element may be R10, a curvature radius of the object-side surface of the sixth lens element may be R11, and the following relationship may be satisfied: $0.3<(R2-R3)/(R10+R11)<2.5$.

Preferably, an absolute value of a focal length of the first, third or sixth lens element may be less than 5 mm.

Preferably, the fourth, fifth and sixth lens elements may be all made of plastic material.

In view of the aforementioned technical problems, the present invention further provides a six-piece lens assembly for capturing images which may comprise: an optical lens for capturing images, in order from an object-side toward an image-side along an optical axis comprising: a first lens element with positive refractive power having a convex image-side surface near the optical axis; a second lens element with negative refractive power having a convex object-side surface near the optical axis, and at least one of the object-side and an image-side surfaces of the second lens element being aspheric; a third lens element with refractive power having a concave image-side surface near the optical axis, and at least one of an object-side and the image-side surfaces of the third lens element having at least one inflection point; a fourth lens element with refractive power near the optical axis, and at least one of an object-side and an image-side surfaces of the fourth lens element having at least one inflection point; a fifth lens element with positive refractive power having a convex image-side surface and a convex object-side surface near the optical axis, and at least one of the object-side and the image-side surfaces of the fifth lens element having at least one inflection point; and a sixth lens element with negative refractive power having a concave image-side surface and a concave object-side surface near the optical axis, and at least one of the object-side and the image-side surfaces of the sixth lens element having at least one inflection point; an image-plane for imaging an object to be imaged; and an aperture stop; wherein an absolute value of a focal length of at least two of the six lens elements may be less than 5 mm, a curvature radius of the image-side surface of the second lens element may be R4, a curvature radius of the object-side surface of the third lens element may be R5, and the aforementioned parameters may be satisfied with the following relationship: R5−R4<0.5 mm.

Preferably, an entrance pupil diameter of the six-piece lens assembly for capturing images may be EPD, and the following relationship may be satisfied: 1.2 mm<EPD<2.0 mm.

Preferably, a distance from the object-side surface of the first lens element to the image-plane on the optical axis may be TL, a curvature radius of the object-side surface of the first lens element may be R1, and the following relationship may be satisfied: 1<TL/R1<2.5.

Preferably, a distance from the image-side surface of the first lens element to the object-side surface of the second lens element on the optical axis may be D12, a focal length of the first lens element may be f1, and the following relationship may be satisfied: 0.015<D12/f1<0.04.

Preferably, a sum of a central thickness of the six lens elements may be Σ(CT), a focal length of the optical lens for capturing images may be f, and the following relationship may be satisfied: 0.6<Σ(CT)/f<1.

Preferably, a curvature radius of the image-side surface of the first lens element may be R2, a curvature radius of the object-side surface of the second lens element may be R3, a curvature radius of the image-side surface of the fifth lens element may be R10, a curvature radius of the object-side surface of the sixth lens element may be R11, and the following relationship may be satisfied: 0.3<(R2−R3)/(R10+R11)<2.5.

Preferably, the third lens element may have positive refractive power near the optical axis.

Preferably, an absolute value of a focal length of the first, third or sixth lens element may be less than 5 mm.

Preferably, an Abbe number of the first lens element may be vd1, an Abbe number of the second lens element may be vd2, and the following relationship may be satisfied: 25<vd1−vd2<35.

Preferably, the aperture stop may be disposed between the object and the first lens element.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1A:
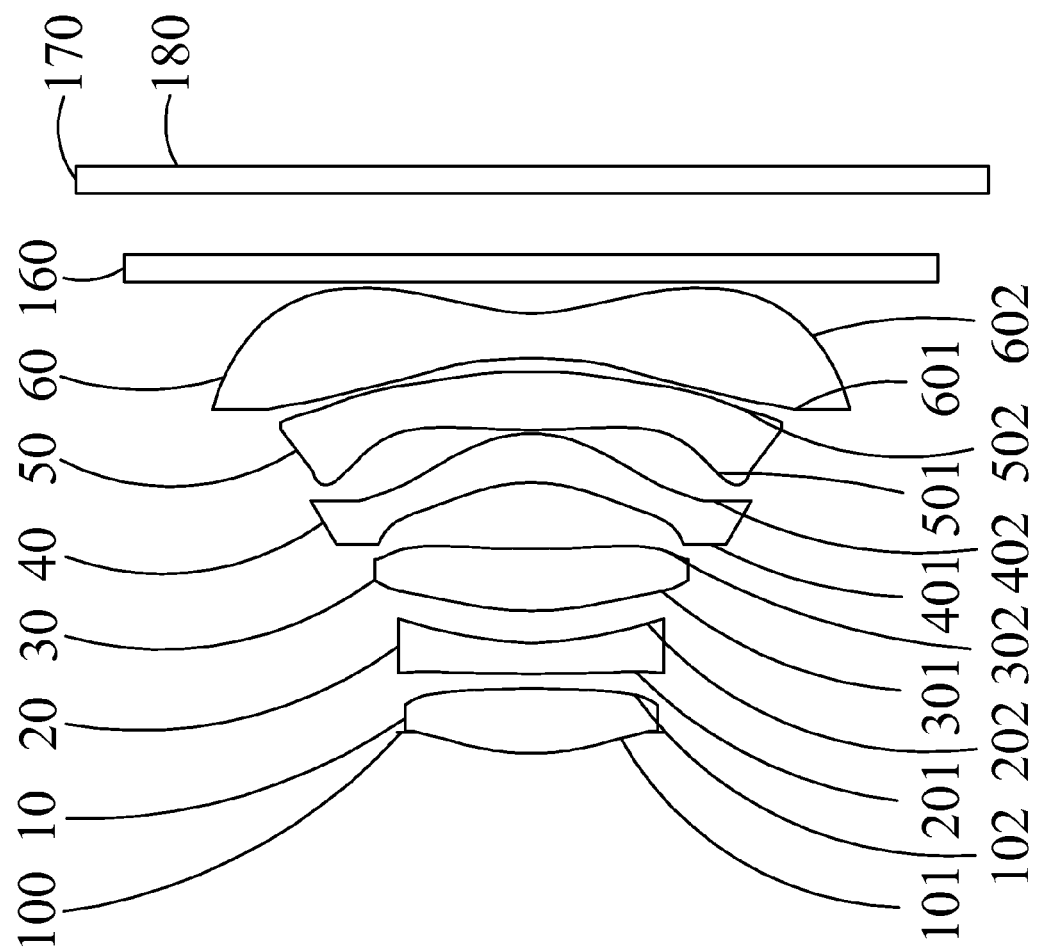
FIG. 1A is a schematic diagram of the first embodiment of a six-piece lens assembly for capturing images according to the present invention.

Please refer to FIG. 1A which is a schematic diagram of the first embodiment of a six-piece lens assembly for capturing images according to the present invention. As FIG. 1A shows, the present invention comprises an optical lens for capturing images, in order from an object side toward an image side along the optical axis comprising: a first lens element 10, a second lens element 20, a third lens element 30, a fourth lens element 40, a fifth lens element 50, and a sixth lens element 60.

The first lens element 10 with positive refractive power has a convex image-side surface 102 near an optical axis; the second lens element 20 with negative refractive power has a convex object-side surface 201 near the optical axis, and at least one of the object-side 201 and an image-side 202 surfaces of the second lens element is aspheric; the third lens element 30 with refractive power has a concave image-side surface 302 near the optical axis, and at least one of an object-side 301 and the image-side 302 surfaces of the third lens element has at least one inflection point.

The fourth lens element 40 with refractive power near the optical axis, and at least one of an object-side 401 and an image-side 402 surfaces of the fourth lens element is aspheric, or at least one of an object-side 401 and an image-side 402 surfaces of the fourth lens element has at least one inflection point; the fifth lens element 50 with positive refractive power has a convex image-side surface 502 and a convex object-side surface 501 near the optical axis, and at least one of the object-side 501 and the image-side 502 surfaces of the fifth lens element has at least one inflection point; and the sixth lens element 60 has a concave image-side surface 602 and a concave object-side surface 601 near the optical axis, and at least one of the object-side 601 and the image-side 602 surfaces of the sixth lens element has at least one inflection point. The first embodiment takes the sixth lens element 60 with positive refractive power as the example, but it shall not be subject to this restriction, and it can also be applied by the sixth lens element 60 with negative refractive power.

The aspheric optical surface used in the present invention can be manufactured as a shape besides a spherical surface to obtain more controlled variables to diminish aberration so as to further provide better resolving power and compactness between the lens elements, as well as effectively reduce the total length of the lens.

The six-piece lens assembly for capturing image of the present disclosure further includes an aperture stop 100 and an IR filter 160. The aperture stop 100 which is disposed between the object and the first lens element 10. The IR filter 160 is disposed between the sixth lens element 60 and an image-plane 170, and the IR filter 160 is usually made of plate optical materials which does not affect the focal length of the six-piece lens assembly for capturing image of the present disclosure.

The six-piece lens assembly for capturing image of the present disclosure further includes an image sensor 180 disposed on the image-plane 170 for imaging an object to be imagined. The first 10, second 20, third 30, fourth 40, fifth 50 and sixth 60 lens elements includes a plastic material or a glass material, and the aspheric formula is:

$$z=ch^2/[1+[1-(k+1)c^2h^2]^{0.5}]+Ah^4+Bh^6+Ch^8+Dh^{10}+Eh^{12}+Fh^{14}+Gh^{16}+Hh^{18}+Jh^{20}+\ldots, \quad (1).$$

Wherein, z is a position of altitude h along the optical axis of which surface vertex is served as reference positional value; k is a conic constant, c is the reciprocal of curvature radius and A, B, C, D, E, F, G and H are high order aspheric coefficients.

The optical statistic of the first embodiment is shown in Table 1, wherein the all of the object-side and the image-side surfaces of the first 10 to the sixth 60 lens elements are consisted of the aspheric formulas (1), and the aspheric coefficients are shown in Table 2, wherein, a distance TL from the object-side surface of the first lens element to the image-plane on the optical axis is 4.59 mm; a distance OL from the object-side surface of the first lens element to the image-side surface of the sixth lens element is 3.439 mm; a focal length f of the optical lens for capturing images is 3.0519 mm; a curvature radius R1 of the object-side surface of the first lens element is 2.036 mm; a curvature radius R2 of the image-side surface of the first lens element is −10.000 mm; a curvature radius R3 of the object-side surface of the second lens element is 10.000 mm; a curvature radius R4 of the image-side surface of the second lens element is 1.976 mm; a curvature radius R5 of the object-side surface of the third lens element is 2.125 mm; a curvature radius R10 of the image-side surface of the fifth lens element is −4.321 mm; and a curvature radius R11 of the object-side surface of the sixth lens element is −4.046 mm.

A distance D12 from the image-side surface of the first lens element to the object-side surface of the second lens element on the optical axis is 0.115 mm; a distance D23 from the image-side surface of the second lens element to the object-side surface of the third lens element on the optical axis is 0.253 mm; a distance D45 from the image-side surface of the fourth lens element to the object-side surface of the fifth lens element on the optical axis is 0.027 mm; an entrance pupil diameter EPD of the six-piece lens assembly for capturing images is 1.738 mm; a sum Σ(CT) of a central thickness of the six lens elements is 2.426 mm, a focal length f1 of the first lens element is 3.218 mm; a focal length f2 of the second lens element is −3.894 mm; a focal length f3 of the third lens element is 4.950 mm; a focal length f4 of the fourth lens element is 4.171 mm; a focal length f5 of the fifth lens element is 4.950 mm; a focal length f6 of the sixth lens element is −1.765 mm; an Abbe number of the first lens element vd1 is 55.7; an Abbe number of the second lens element vd2 is 22.4. TL/R1=2.254, D23/D45=9.376, OL/EPD=1.797, D12/f1=0.036, ΣCT/f=0.689, (R2−R3)/(R10+R11)=2.390, vd1−vd2=33.3, R5−R4=0.149.

TABLE 1

Basic lens element data of the first embodiment

| Surface# | | Curvature radius(mm) | Thickness (mm) | Index (Nd) | Abbe# (Vd) | Focal length (mm) |
|---|---|---|---|---|---|---|
| Aperture stop | | ∞ | −0.160 | | | |
| First lens element | First Surface | 2.036 | 0.505 | 1.535 | 55.7 | 3.218 |
| | Second Surface | −10.000 | 0.115 | | | |
| Second lens element | Third Surface | 10.000 | 0.240 | 1.643 | 22.4 | −3.894 |
| | Fourth Surface | 1.976 | 0.253 | | | |
| Third lens element | Fifth Surface | 2.125 | 0.487 | 1.535 | 55.7 | 4.950 |
| | Sixth Surface | 10.000 | 0.514 | | | |
| Fourth lens element | Seventh Surface | −1.254 | 0.387 | 1.535 | 55.7 | 4.171 |
| | Eighth Surface | −0.888 | 0.027 | | | |
| Fifth lens element | Ninth Surface | 6.544 | 0.456 | 1.535 | 55.7 | 4.950 |
| | Tenth Surface | −4.321 | 0.105 | | | |
| Sixth lens element | Eleventh Surface | −4.046 | 0.350 | 1.535 | 55.7 | −1.765 |
| | Twelfth Surface | 1.265 | 0.201 | | | |
| Filter | Thirteen Surface | ∞ | 0.21 | 1.517 | 64.17 | |
| | Fourteenth Surface | ∞ | 0.74 | | | |

TABLE 2

Aspheric coefficients of the first embodiment

| Surface# | 1 | 2 | 3 | 4 | 5 | 6 |
|---|---|---|---|---|---|---|
| k | −8.4370 | −20.8250 | −1458.4391 | −7.1658 | −15.0195 | −220.4687 |
| A | 0.0994 | −0.0475 | −0.0563 | −0.1894 | 0.0333 | 0.0274 |
| B | −0.1207 | 0.2132 | 0.3566 | 0.7494 | −0.0769 | −0.1428 |

TABLE 2-continued

Aspheric coefficients of the first embodiment

| | | | | | | |
|---|---|---|---|---|---|---|
| C | 0.1275 | −0.5148 | −0.6224 | −1.4453 | 0.0643 | 0.2915 |
| D | −0.2156 | 0.3667 | 0.3207 | 1.6872 | −0.0191 | −0.4839 |
| E | 0.1830 | −0.0848 | 0.0815 | −1.2538 | −0.0440 | 0.4541 |
| F | −0.1134 | −0.0276 | −0.1124 | 0.5505 | 0.0532 | −0.2472 |
| G | 0.0321 | 0.0057 | 0.0195 | −0.1101 | −0.0144 | 0.0600 |
| H | −0.0139 | 0.0000 | 0.0000 | 0.0000 | 0.0000 | 0.0000 |
| J | 0.0000 | 0.0000 | 0.0000 | 0.0000 | 0.0000 | 0.0000 |

| Surface# | 7 | 8 | 9 | 10 | 11 | 12 |
|---|---|---|---|---|---|---|
| k | 0.0285 | −4.9223 | 13.6945 | 0.0000 | 0.0000 | −7.1999 |
| A | 0.2522 | −0.3453 | −0.0515 | −0.0853 | −0.1757 | −0.1253 |
| B | −0.0254 | 0.7071 | −0.1212 | 0.2133 | 0.2366 | 0.0900 |
| C | −0.4070 | −1.1844 | 0.1829 | −0.1717 | −0.1296 | −0.0482 |
| D | 1.1506 | 1.3789 | −0.1691 | 0.0627 | 0.0364 | 0.0162 |
| E | −1.2506 | −0.8641 | 0.0743 | −0.0107 | −0.0051 | −0.0032 |
| F | 0.6332 | 0.2597 | −0.0145 | 0.0007 | 0.0003 | 0.0004 |
| G | −0.1291 | −0.0288 | 0.0010 | 0.0000 | 0.0000 | −1.5784e−5 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 1B:
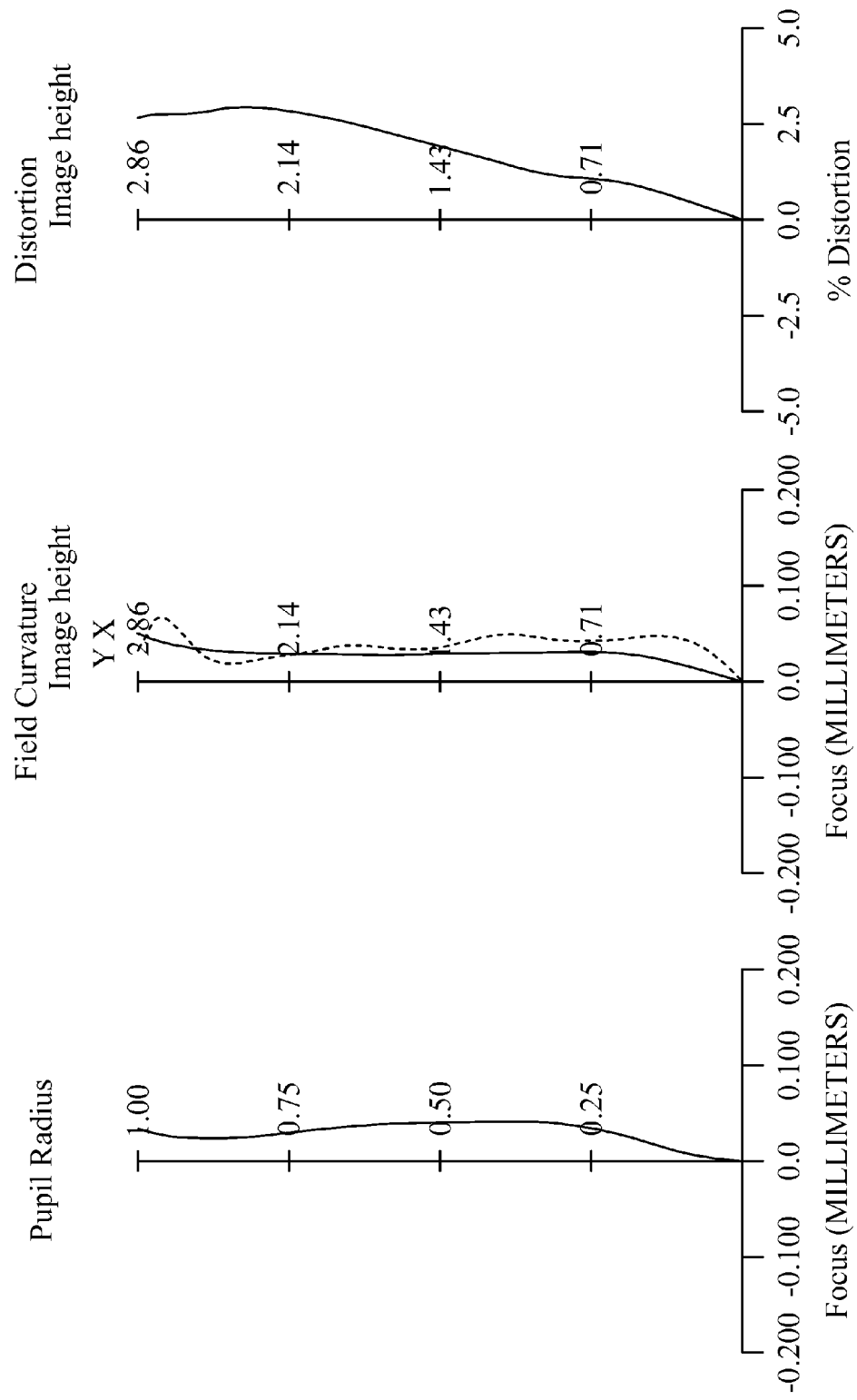
FIG. 1B is astigmatic field curves, a distortion curve and longitudinal spherical aberration curves of the first embodiment according to the present invention.

It can be found by the basic lens element data of table 1 along with the curve diagram of aberration of FIG. 1B that it has better compensation effect upon the astigmatic aberration, the distortion aberration and the longitudinal spherical aberration curves by the embodiment of the six-piece lens assembly for capturing images according to the present invention.

Figure 2A:
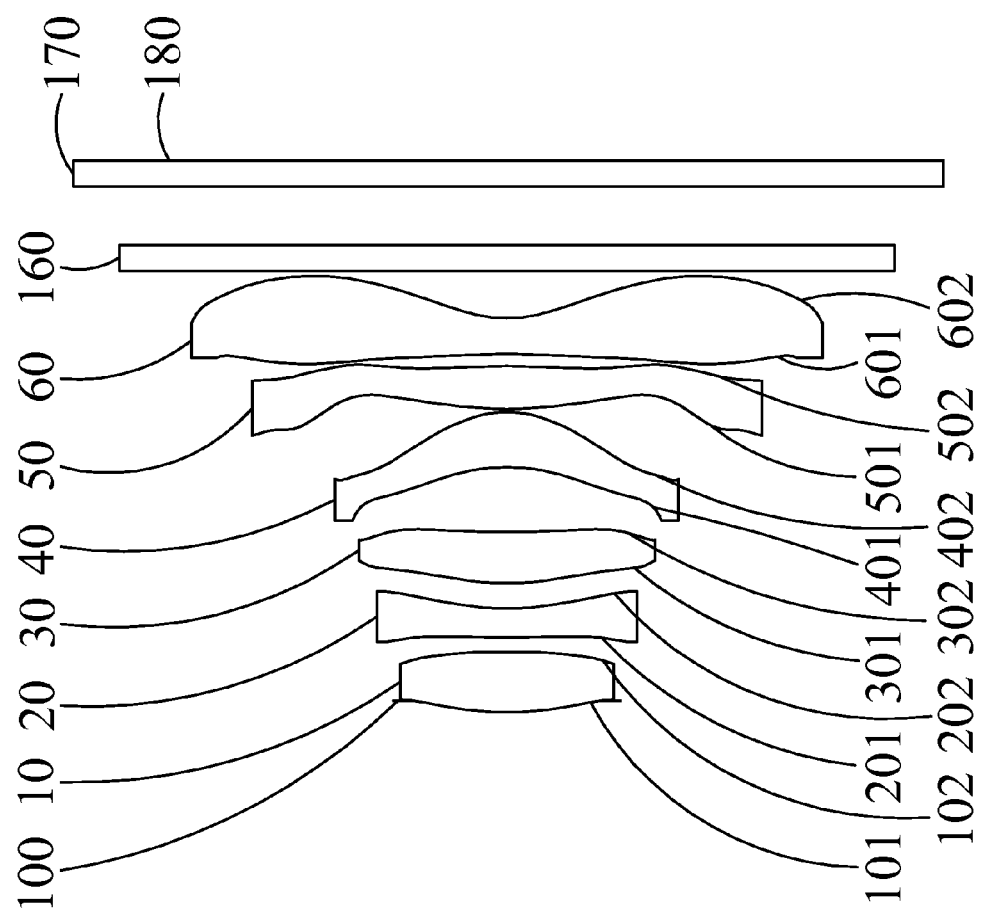
FIG. 2A is a schematic diagram of the second embodiment of a six-piece lens assembly for capturing images according to the present invention.

Please refer to FIG. 2A which is a schematic diagram of the second embodiment of a six-piece lens assembly for capturing images according to the present invention. As the FIG. shows, wherein the all of the object-side and the image-side surfaces of the first 10 to the sixth 60 lens elements are consisted of the aspheric formulas (1), and the aspheric coefficients are shown in Table 4.

The optical data of the second embodiment can be seen in Table 3, wherein a distance TL from the object-side surface of the first lens element to the image-plane on the optical axis is 4.59 mm; a distance OL from the object-side surface of the first lens element to the image-side surface of the sixth lens element is 3.293 mm; a focal length f of the optical lens for capturing images is 3.189 mm; a curvature radius R1 of the object-side surface of the first lens element is 2.636 mm; a curvature radius R2 of the image-side surface of the first lens element is −6.138 mm; a curvature radius R3 of the object-side surface of the second lens element is 10.000 mm; a curvature radius R4 of the image-side surface of the second lens element is 1.926 mm; a curvature radius R5 of the object-side surface of the third lens element is 2.121 mm; a curvature radius R10 of the image-side surface of the fifth lens element is −6.819 mm; and a curvature radius R11 of the object-side surface of the sixth lens element is −6.421 mm.

A distance D12 from the image-side surface of the first lens element to the object-side surface of the second lens element on the optical axis is 0.121 mm; a distance D23 from the image-side surface of the second lens element to the object-side surface of the third lens element on the optical axis is 0.213 mm; a distance D45 from the image-side surface of the fourth lens element to the object-side surface of the fifth lens element on the optical axis is 0.027 mm; an entrance pupil diameter EPD of the six-piece lens assembly for capturing images is 1.571 mm; a sum ΣCT) of a central thickness of the six lens elements is 2.292 mm, a focal length f1 of the first lens element is 3.527 mm; a focal length f2 of the second lens element is −3.771 mm; a focal length f3 of the third lens element is 4.950 mm; a focal length f4 of the fourth lens element is 3.186 mm; a focal length f5 of the fifth lens element is 3.938 mm; a focal length f6 of the sixth lens element is −1.642 mm; an Abbe number of the first lens element vd1 is 55.7; an Abbe number of the second lens element vd2 is 22.4. TL/R1=1.741, D23/D45=7.886, OL/EPD=2.095, D12/f1=0.034, ΣCT/f=0.719, (R2−R3)/(R10+R11)=1.219, vd1−vd2=33.3, R5−R4=0.195.

TABLE 3

Basic lens element data of the second embodiment

| | Surface# | Curvature radius(mm) | Thickness (mm) | Index (Nd) | Abbe# (Vd) | Focal length (mm) |
|---|---|---|---|---|---|---|
| Aperture stop | | ∞ | −0.098 | | | |
| First lens element | First Surface | 2.636 | 0.505 | 1.535 | 55.7 | 3.527 |
| | Second Surface | −6.138 | 0.121 | | | |
| Second lens element | Third Surface | 10.000 | 0.240 | 1.643 | 22.4 | −3.771 |
| | Fourth Surface | 1.926 | 0.213 | | | |
| Third lens element | Fifth Surface | 2.121 | 0.431 | 1.535 | 55.7 | 4.950 |
| | Sixth Surface | 9.997 | 0.538 | | | |
| Fourth lens element | Seventh Surface | −1.387 | 0.458 | 1.535 | 55.7 | 3.186 |
| | Eighth Surface | −0.852 | 0.027 | | | |
| Fifth lens element | Ninth Surface | 2.981 | 0.359 | 1.535 | 55.7 | 3.938 |
| | Tenth Surface | −6.819 | 0.101 | | | |
| Sixth lens element | Eleventh Surface | −6.421 | 0.300 | 1.535 | 55.7 | −1.642 |
| | Twelfth Surface | 1.031 | 0.347 | | | |
| Filter | Thirteen Surface | ∞ | 0.21 | 1.517 | 64.17 | |
| | Fourteenth Surface | ∞ | 0.74 | | | |

TABLE 4

Aspheric coefficients of the second embodiment

| Surface# | 1 | 2 | 3 | 4 | 5 | 6 |
|---|---|---|---|---|---|---|
| k | −19.6062 | 17.3812 | −1458.4591 | −12.0623 | −30.3947 | −220.4687 |
| A | 0.0908 | −0.0460 | −0.1323 | −0.1941 | 0.1502 | 0.0126 |
| B | −0.1384 | 0.2032 | 0.6179 | 0.8046 | −0.4997 | −0.0656 |
| C | 0.1162 | −0.4979 | −1.5004 | −1.7608 | 0.9111 | 0.0613 |
| D | −0.1932 | 0.3822 | 2.0412 | 2.2760 | −1.1318 | −0.1162 |
| E | 0.2071 | −0.0850 | −1.8821 | −1.8541 | 0.8018 | −0.0956 |
| F | −0.1237 | 0.0057 | 1.1040 | 0.8802 | −0.2698 | −0.0466 |
| G | −0.0077 | 0.0000 | −0.3090 | −0.1857 | 0.0322 | 0.0138 |
| H | 0.0157 | 0.0000 | 0.0000 | 0.0000 | 0.0000 | 0.0000 |
| J | 0.0000 | 0.0000 | 0.0000 | 0.0000 | 0.0000 | 0.0000 |

| Surface# | 7 | 8 | 9 | 10 | 11 | 12 |
|---|---|---|---|---|---|---|
| k | −0.1008 | −3.0359 | −16.9940 | 0.0000 | 0.0000 | −4.6647 |
| A | 0.1850 | −0.1375 | −0.0273 | 0.0181 | 0.0824 | −0.0811 |
| B | 0.0423 | 0.1543 | −0.0049 | 0.1619 | −0.0720 | 0.0354 |
| C | −0.4219 | −0.1597 | 0.0705 | −0.1649 | 0.0329 | −0.0149 |
| D | 0.9587 | 0.1338 | −0.0911 | 0.0627 | −0.0078 | 0.0048 |
| E | −0.9634 | 0.0121 | 0.0410 | −0.0107 | 0.0009 | −0.0010 |
| F | 0.4661 | −0.0546 | −0.0078 | 0.0007 | −4.6470e−5 | 0.00010 |
| G | −0.0912 | 0.0152 | 0.0005 | 0.0000 | 0.0000 | −4.8329e−6 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 2B:
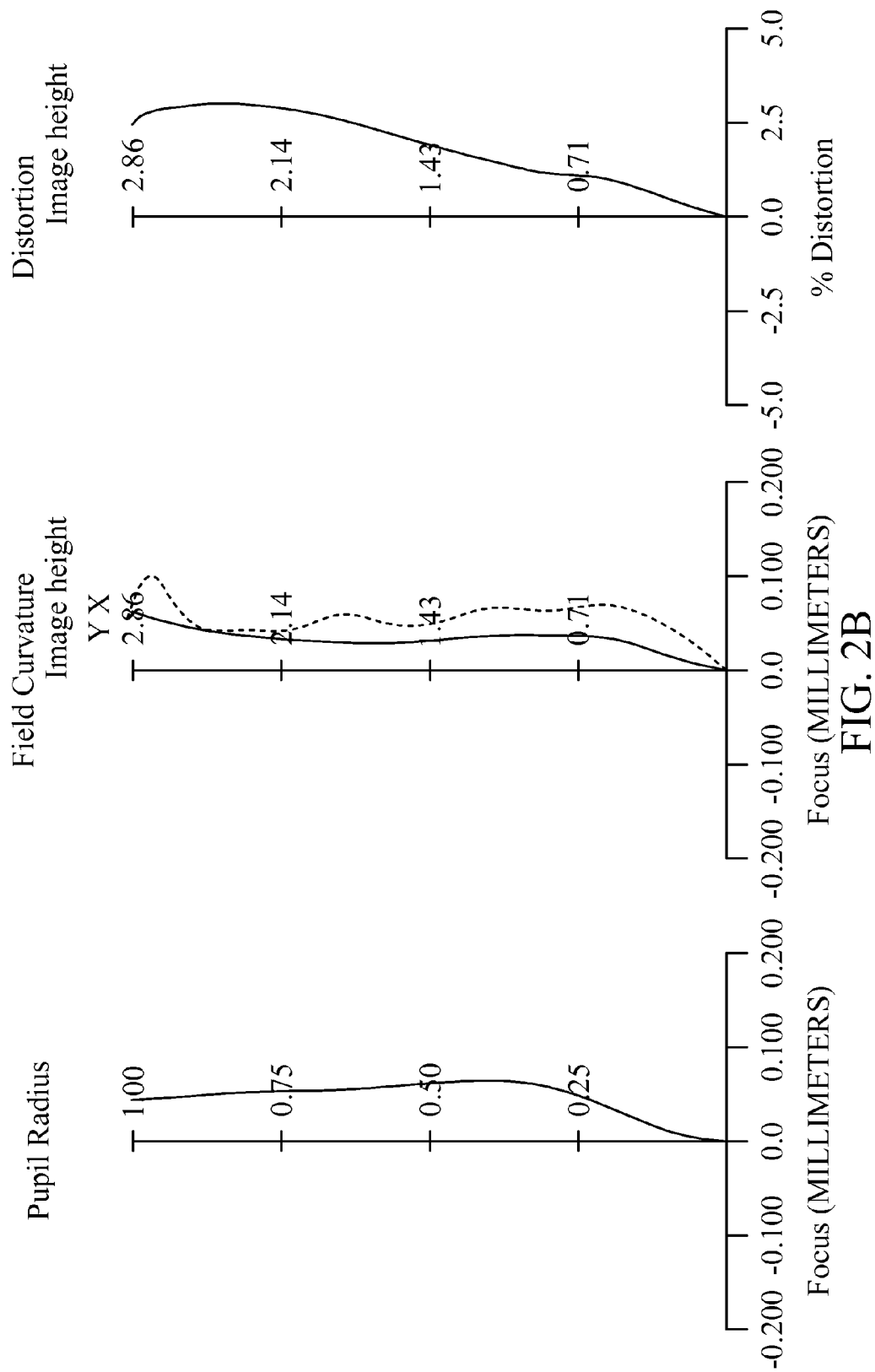
FIG. 2B is astigmatic field curves, a distortion curve and longitudinal spherical aberration curves of the second embodiment according to the present invention.

It can be found by the basic lens element data of table 3 along with the curve diagram of aberration of FIG. 2B that it has better compensation effect upon the astigmatic aberration, the distortion aberration and the longitudinal spherical aberration curves by the embodiment of the six-piece lens assembly for capturing images according to the present invention.

Figure 3A:
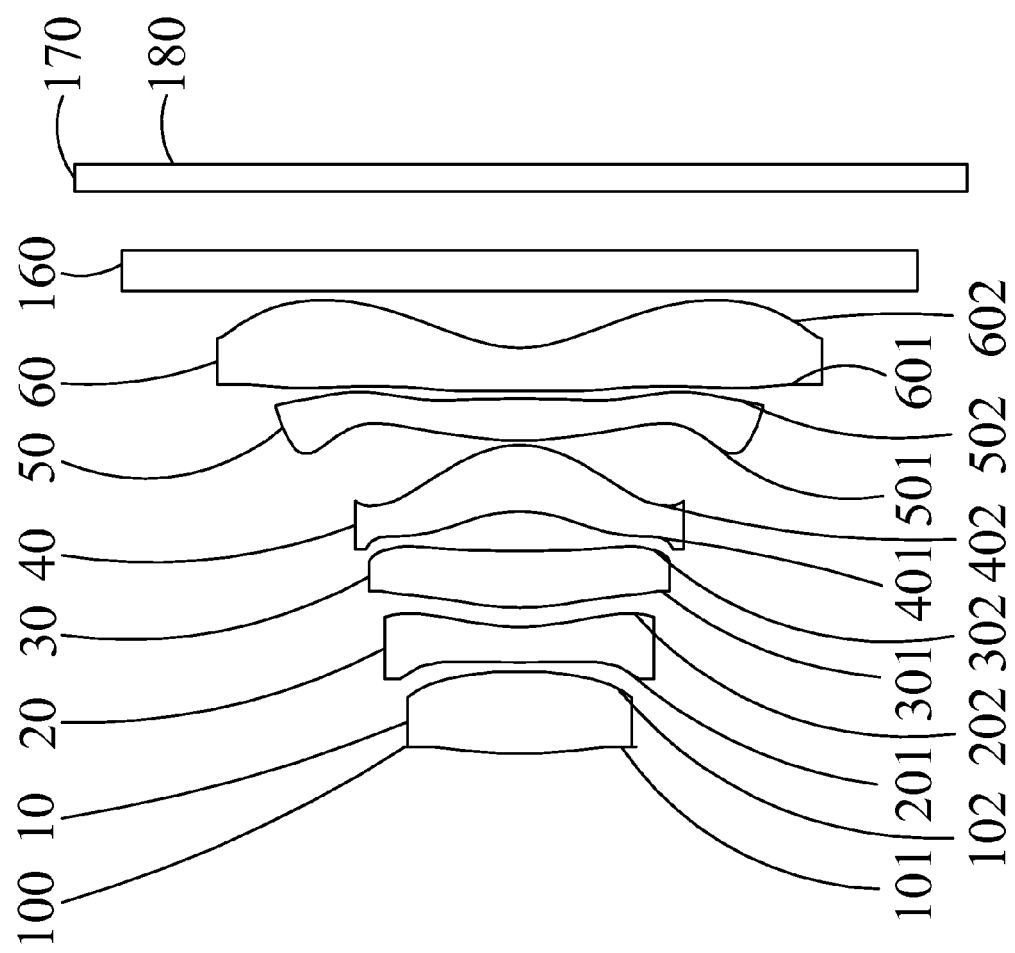
FIG. 3A is a schematic diagram of the third embodiment of a six-piece lens assembly for capturing images according to the present invention.

Please refer to FIG. 3A which is a schematic diagram of the third embodiment of a six-piece lens assembly for capturing images according to the present invention. As the FIG. shows, wherein the all of the object-side and the image-side surfaces of the first 10 to the sixth 60 lens elements are consisted of the aspheric formulas (1), and the aspheric coefficients are shown in Table 6.

The optical data of the third embodiment can be seen in Table 5, wherein a distance TL from the object-side surface of the first lens element to the image-plane on the optical axis is 3.030 mm; a distance OL from the object-side surface of the first lens element to the image-side surface of the sixth lens element is 2.147 mm; a focal length f of the optical lens for capturing images is 1.861 mm; a curvature radius R1 of the object-side surface of the first lens element is 2.529 mm; a curvature radius R2 of the image-side surface of the first lens element is −2.023 mm; a curvature radius R3 of the object-side surface of the second lens element is 4.697 mm; a curvature radius R4 of the image-side surface of the second lens element is 1.070 mm; a curvature radius R5 of the object-side surface of the third lens element is 1.266 mm; a curvature radius R10 of the image-side surface of the fifth lens element is −5.051 mm; and a curvature radius R11 of the object-side surface of the sixth lens element is −9.271 mm.

A distance D12 from the image-side surface of the first lens element to the object-side surface of the second lens element on the optical axis is 0.049 mm; a distance D23 from the image-side surface of the second lens element to the object-side surface of the third lens element on the optical axis is 0.100 mm; a distance D45 from the image-side surface of the fourth lens element to the object-side surface of the fifth lens element on the optical axis is 0.025 mm; an entrance pupil diameter EPD of the six-piece lens assembly for capturing images is 1.014 mm; a sum ΣCT of a central thickness of the six lens elements is 1.723 mm, a focal length f1 of the first lens element is 2.178 mm; a focal length f2 of the second lens element is −2.211 mm; a focal length f3 of the third lens element is 2.685 mm; a focal length f4 of the fourth lens element is 2.048 mm; a focal length f5 of the fifth lens element is 2.277 mm; a focal length f6 of the sixth lens element is −1.065 mm; an Abbe number of the first lens element vd1 is 55.7; an Abbe number of the second lens element vd2 is 22.4. TL/R1=1.198, D23/D45=4.000, OL/EPD=2.117, D12/f1=0.022, ΣCT/f=0.926, (R2−R3)/(R10+R11)=0.469, vd1−vd2=33.3, R5−R4=0.196.

TABLE 5

Basic lens element data of the third embodiment

| | Surface# | Curvature radius(mm) | Thickness (mm) | Index (Nd) | Abbe# (Vd) | Focal length (mm) |
|---|---|---|---|---|---|---|
| Aperture stop | | ∞ | −0.035 | | | |
| First lens element | First Surface | 2.529 | 0.433 | 1.535 | 55.7 | 2.178 |
| | Second Surface | −2.023 | 0.049 | | | |
| Second lens element | Third Surface | 4.697 | 0.190 | 1.643 | 22.4 | −2.211 |
| | Fourth Surface | 1.070 | 0.100 | | | |
| Third lens element | Fifth Surface | 1.266 | 0.300 | 1.535 | 55.7 | 2.685 |
| | Sixth Surface | 10.000 | 0.208 | | | |
| Fourth lens element | Seventh Surface | −0.669 | 0.352 | 1.535 | 55.7 | 2.048 |
| | Eighth Surface | −0.491 | 0.025 | | | |
| Fifth lens element | Ninth Surface | 1.575 | 0.220 | 1.535 | 55.7 | 2.277 |
| | Tenth Surface | −5.051 | 0.040 | | | |
| Sixth lens element | Eleventh Surface | −9.271 | 0.230 | 1.535 | 55.7 | −1.065 |
| | Twelfth Surface | 0.611 | 0.253 | | | |
| Filter | Thirteen Surface | ∞ | 0.21 | 1.517 | 64.17 | |

TABLE 5-continued

Basic lens element data of the third embodiment

| Surface# | Curvature radius(mm) | Thickness (mm) | Index (Nd) | Abbe# (Vd) | Focal length (mm) |
|---|---|---|---|---|---|
| Fourteenth Surface | ∞ | 0.42 | | | |

TABLE 6

Aspheric coefficients of the third embodiment

| Surface# | 1 | 2 | 3 | 4 | 5 | 6 |
|---|---|---|---|---|---|---|
| k | −59.5118 | 8.1542 | −1458.4591 | −23.6867 | −28.9091 | −220.4687 |
| A | 0.2721 | −0.1082 | −0.1913 | 0.1889 | 0.4896 | −0.0479 |
| B | −1.4495 | 1.3927 | −1.9985 | −2.4736 | −4.9990 | 3.2732 |
| C | 3.1449 | −10.9095 | 27.1444 | 19.4929 | 24.4922 | −25.6788 |
| D | −11.6171 | 24.2633 | −206.4313 | −101.8065 | −84.9720 | 110.6182 |
| E | 30.5602 | −12.1181 | 700.6853 | 265.6365 | 180.0676 | −286.0730 |
| F | −52.0471 | −13.6534 | −1136.0508 | −333.7620 | −189.5141 | 384.0016 |
| G | −3.7589 | 3.5718 | 704.1745 | 159.0128 | 72.0435 | −203.8223 |
| H | 40.9975 | 0.0000 | 0.0000 | 0.0000 | 0.0000 | 0.0000 |
| J | 0.0000 | 0.0000 | 0.0000 | 0.0000 | 0.0000 | 0.0000 |

| Surface# | 7 | 8 | 9 | 10 | 11 | 12 |
|---|---|---|---|---|---|---|
| k | −0.4752 | −2.6534 | −17.0835 | 0.0000 | 0.0000 | −4.6285 |
| A | 1.2074 | −0.7134 | −0.3145 | 0.1365 | 0.7985 | −0.1391 |
| B | 2.0750 | 3.2732 | 1.4872 | 1.5802 | −1.9566 | −0.0387 |
| C | 13.4792 | −7.6375 | −2.3726 | −4.1114 | 2.1158 | 0.0680 |
| D | 66.0102 | 8.9294 | 0.911 | 3.9174 | −1.1855 | −0.0232 |
| E | −191.6637 | 11.7984 | 0.2918 | −1.6706 | 0.3408 | 0.0003 |
| F | 268.0484 | −37.3911 | −0.1490 | 0.2684 | −0.0401 | 3.3655e−5 |
| G | −143.1342 | 23.5515 | −0.0052 | 0.0000 | 0.0000 | 0.0002 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 3B:
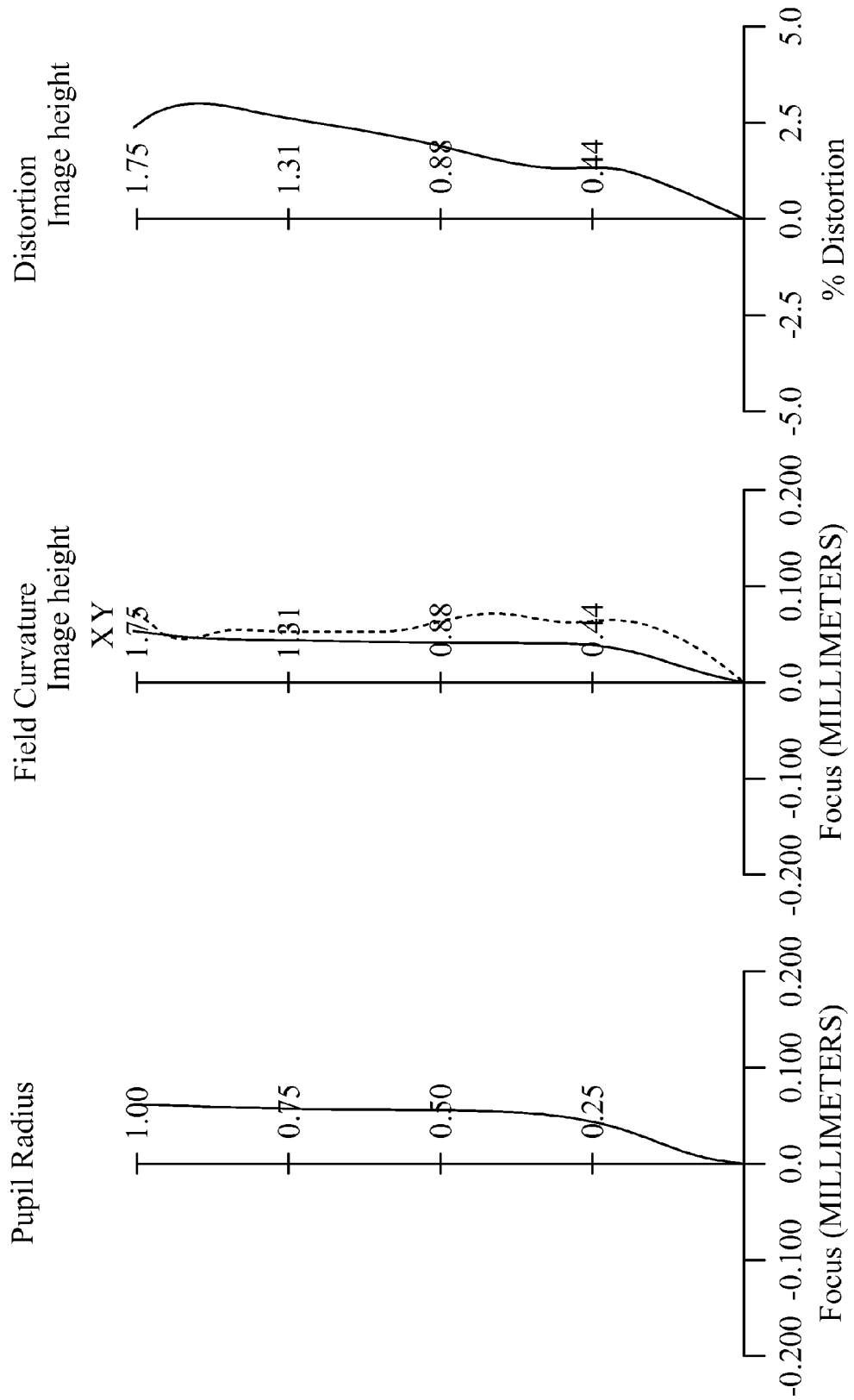
FIG. 3B is astigmatic field curves, a distortion curve and longitudinal spherical aberration curves of the third embodiment according to the present invention.

It can be found by the basic lens element data of table 5 along with the curve diagram of aberration of FIG. 3B that it has better compensation effect upon the astigmatic aberration, the distortion aberration and the longitudinal spherical aberration curves by the embodiment of the six-piece lens assembly for capturing images according to the present invention.

Figure 4A:
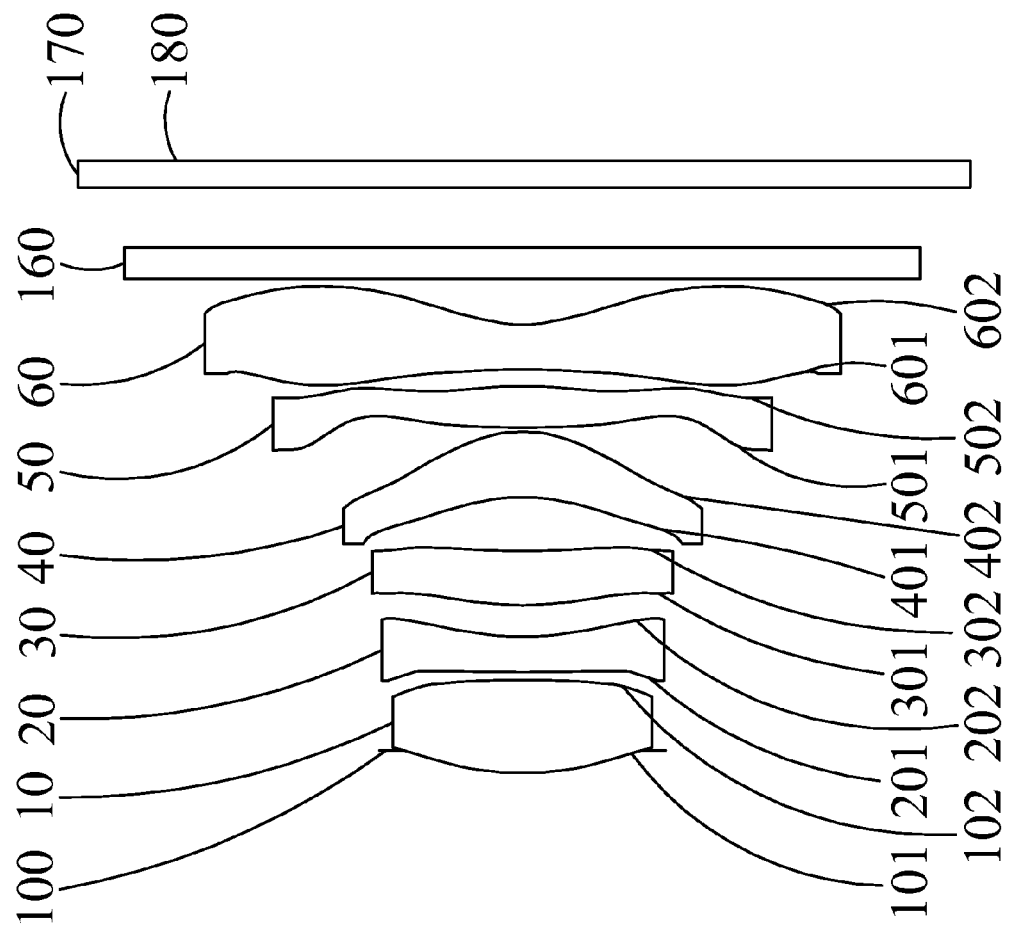
FIG. 4A is a schematic diagram of the fourth embodiment of a six-piece lens assembly for capturing images according to the present invention.

Please refer to FIG. 4A which is a schematic diagram of the fourth embodiment of a six-piece lens assembly for capturing images according to the present invention. As the FIG. shows, wherein the all of the object-side and the image-side surfaces of the first 10 to the sixth 60 lens elements are consisted of the aspheric formulas (1), and the aspheric coefficients are shown in Table 8.

The optical data of the fourth embodiment can be seen in table 7, wherein a distance TL from the object-side surface of the first lens element to the image-plane on the optical axis is 4.05 mm; a distance OL from the object-side surface of the first lens element to the image-side surface of the sixth lens element is 3.010 mm; a focal length f of the optical lens for capturing images is 2.882 mm; a curvature radius R1 of the object-side surface of the first lens element is 1.867 mm; a curvature radius R2 of the image-side surface of the first lens element is −6.208 mm; a curvature radius R3 of the object-side surface of the second lens element is 8.163 mm; a curvature radius R4 of the image-side surface of the second lens element is 1.681 mm; a curvature radius R5 of the object-side surface of the third lens element is 1.910 mm; a curvature radius R10 of the image-side surface of the fifth lens element is −3.061 mm; and a curvature radius R11 of the object-side surface of the sixth lens element is −5.853 mm.

A distance D12 from the image-side surface of the first lens element to the object-side surface of the second lens element on the optical axis is 0.049 mm; a distance D23 from the image-side surface of the second lens element to the object-side surface of the third lens element on the optical axis is 0.212 mm; a distance D45 from the image-side surface of the fourth lens element to the object-side surface of the fifth lens element on the optical axis is 0.027 mm; an entrance pupil diameter EPD of the six-piece lens assembly for capturing images is 1.575 mm; a sum Σ(CT) of a central thickness of the six lens elements is 2.25 mm, a focal length f1 of the first lens element is 2.764 mm; a focal length f2 of the second lens element is −3.357 mm; a focal length f3 of the third lens element is 4.990 mm; a focal length f4 of the fourth lens element is 2.662 mm; a focal length f5 of the fifth lens element is 4.163 mm; a focal length f6 of the sixth lens element is −1.452 mm; an Abbe number of the first lens element vd1 is 55.7; an Abbe number of the second lens element vd2 is 22.4. TL/R1=2.170, D23/D45=7.834, OL/EPD=1.912, D12/f1=0.018, ΣCT/f=0.781, (R2−R3)/(R10+R11)=1.612, vd1−vd2=33.3, R5−R4=0.229.

TABLE 7

Basic lens element data of the fourth embodiment

| | Surface# | Curvature radius(mm) | Thickness (mm) | Index (Nd) | Abbe# (Vd) | Focal length (mm) |
|---|---|---|---|---|---|---|
| | Aperture stop | ∞ | −0.153 | | | |
| First lens element | First Surface | 1.867 | 0.626 | 1.535 | 55.7 | 2.764 |
| | Second Surface | −6.208 | 0.049 | | | |
| Second lens element | Third Surface | 8.163 | 0.240 | 1.643 | 22.4 | −3.357 |
| | Fourth Surface | 1.681 | 0.212 | | | |
| Third lens element | Fifth Surface | 1.910 | 0.366 | 1.535 | 55.7 | 4.990 |
| | Sixth Surface | 6.307 | 0.360 | | | |
| Fourth lens element | Seventh Surface | −1.248 | 0.439 | 1.535 | 55.7 | 2.662 |
| | Eighth Surface | −0.746 | 0.027 | | | |

TABLE 7-continued

Basic lens element data of the fourth embodiment

| | Surface# | Curvature radius(mm) | Thickness (mm) | Index (Nd) | Abbe# (Vd) | Focal length (mm) |
|---|---|---|---|---|---|---|
| Fifth lens element | Ninth Surface | 7.842 | 0.279 | 1.535 | 55.7 | 4.163 |
| | Tenth Surface | −3.061 | 0.113 | | | |
| Sixth lens element | Eleventh Surface | −5.853 | 0.300 | 1.535 | 55.7 | −1.452 |
| | Twelfth Surface | 0.909 | 0.260 | | | |
| Filter | Thirteen Surface | ∞ | 0.21 | 1.517 | 64.17 | |
| | Fourteenth Surface | ∞ | 0.57 | | | |

TABLE 8

Aspheric coefficients of the fourth embodiment

| Surface# | 1 | 2 | 3 | 4 | 5 | 6 |
|---|---|---|---|---|---|---|
| k | −13.2419 | 4.3448 | −1458.4591 | −8.9951 | −30.3943 | −220.4710 |
| A | 0.2153 | −0.0544 | −0.0604 | −0.2239 | 0.2178 | 0.0717 |
| B | −0.3292 | 0.6503 | 0.6973 | 1.2514 | −0.9256 | −0.1767 |
| C | 0.5586 | 2.3760 | −2.3997 | −3.6853 | 1.3033 | −0.3539 |
| D | −1.3978 | 2.5652 | 2.8402 | 6.1942 | 0.2368 | 1.3091 |
| E | 2.3592 | −0.5215 | −2.4414 | −7.2625 | −4.5375 | −2.1437 |
| F | −1.8678 | −0.5925 | 2.9884 | 5.6518 | 6.3633 | 1.7585 |
| G | −0.0262 | 0.0957 | −1.9673 | −2.0701 | −2.7106 | −0.5112 |
| H | 0.4940 | 0.0000 | 0.0000 | 0.0000 | 0.0000 | 0.0000 |
| J | 0.0000 | 0.0000 | 0.0000 | 0.0000 | 0.0000 | 0.0000 |
| Surface# | 7 | 8 | 9 | 10 | 11 | 12 |
| k | −0.0076 | −3.8230 | −16.9900 | 0.0000 | 0.0000 | 5.2264 |
| A | 0.2429 | −0.2168 | 0.0809 | 0.1110 | 0.0505 | −0.1551 |
| B | 0.3483 | 0.3644 | 0.0066 | 0.4563 | −0.1235 | 0.1127 |
| C | −1.5665 | −0.2156 | −0.0047 | −0.7547 | 0.1220 | −0.0717 |
| D | 3.4341 | −0.4713 | −0.1841 | 0.4464 | −0.0519 | 0.0338 |
| E | −4.2685 | 1.2666 | 0.1587 | −0.1175 | 0.0105 | 0.0101 |
| F | 2.9252 | −1.0136 | −0.0468 | 0.0116 | −0.0008 | 0.0017 |
| G | −0.8708 | 0.2649 | 0.0046 | 0.0000 | 0.0000 | −0.0001 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 4B:
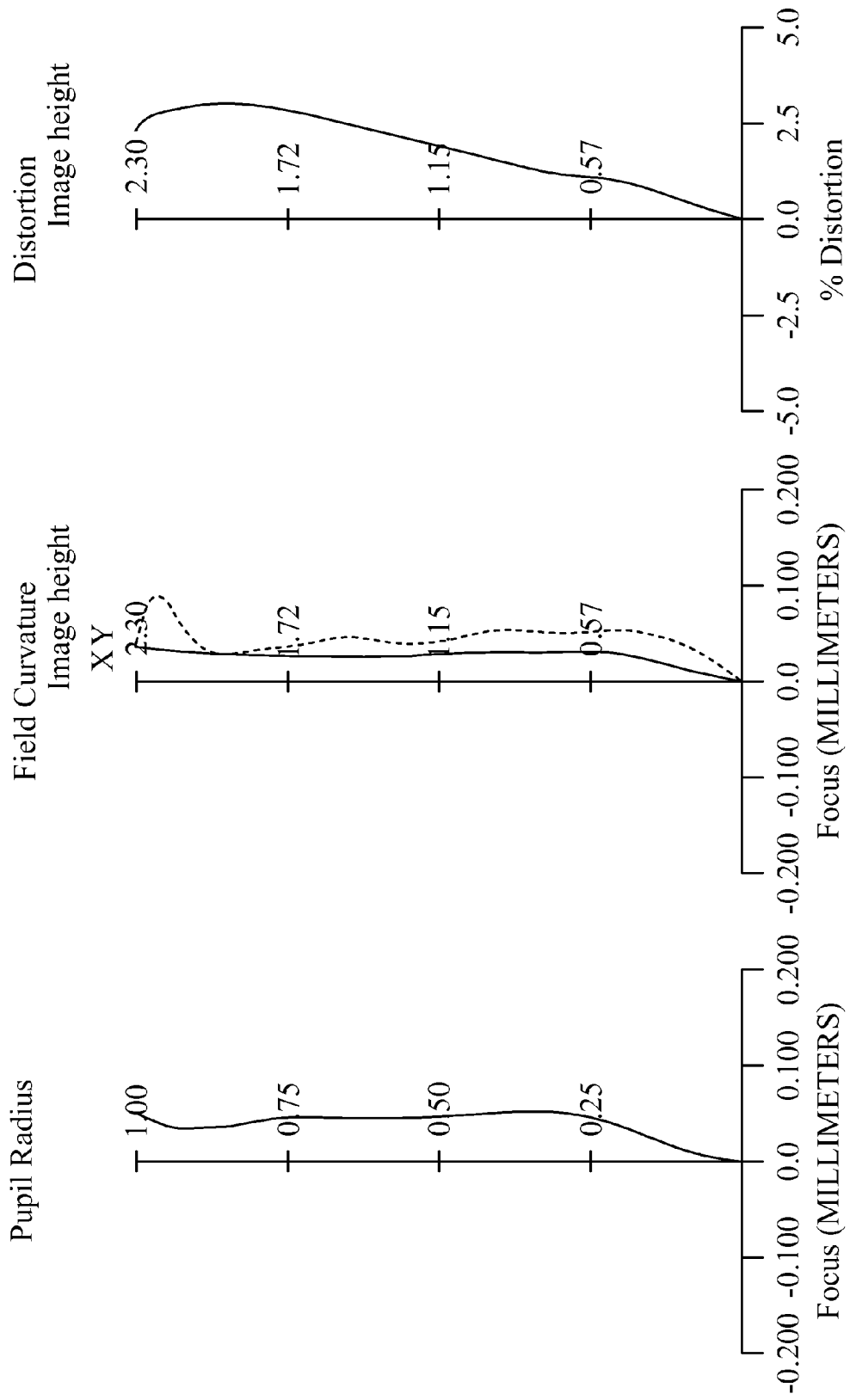
FIG. 4B is astigmatic field curves, a distortion curve and longitudinal spherical aberration curves of the fourth embodiment according to the present invention.

It can be found by the basic lens element data of table 7 along with the curve diagram of aberration of FIG. 4B that it has better compensation effect upon the astigmatic aberration, the distortion aberration and the longitudinal spherical aberration curves by the embodiment of the six-piece lens assembly for capturing images according to the present invention.

Figure 5A:
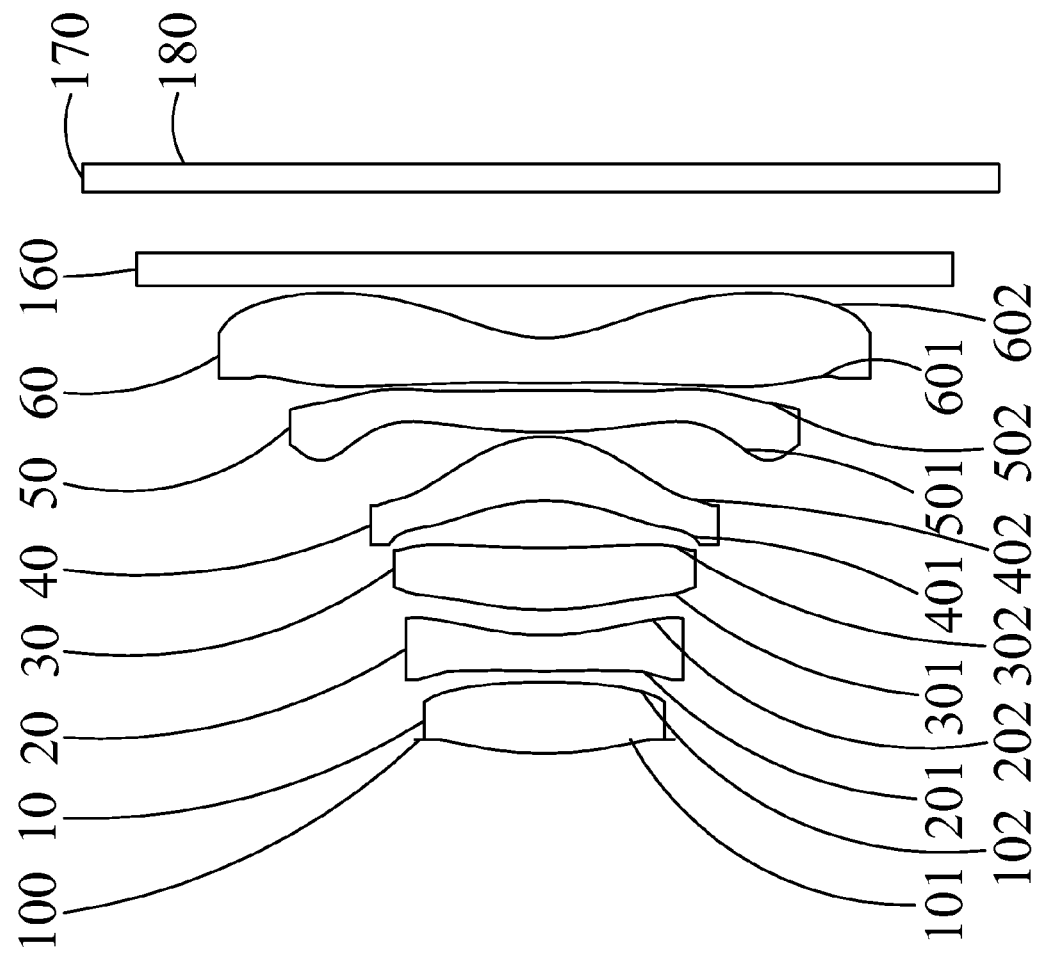
FIG. 5A is a schematic diagram of the fifth embodiment of a six-piece lens assembly for capturing images according to the present invention.

Please refer to FIG. 5A which is a schematic diagram of the fifth embodiment of a six-piece lens assembly for capturing images according to the present invention. As the FIG. shows, wherein the all of the object-side and the image-side surfaces of the first 10 to the sixth 60 lens elements are consisted of the aspheric formulas (1), and the aspheric coefficients are shown in Table 10.

The optical data of the fifth embodiment can be seen in table 9, wherein a distance TL from the object-side surface of the first lens element to the image-plane on the optical axis is 3.837 mm; a distance OL from the object-side surface of the first lens element to the image-side surface of the sixth lens element is 2.757 mm; a focal length f of the optical lens for capturing images is 2.589 mm; a curvature radius R1 of the object-side surface of the first lens element is 2.166 mm; a curvature radius R2 of the image-side surface of the first lens element is −4.022 mm; a curvature radius R3 of the object-side surface of the second lens element is 8.853 mm; a curvature radius R4 of the image-side surface of the second lens element is 1.544 mm; a curvature radius R5 of the object-side surface of the third lens element is 1.795 mm; a curvature radius R10 of the image-side surface of the fifth lens element is −10.000 mm; and a curvature radius R11 of the object-side surface of the sixth lens element is −10.000 mm.

A distance D12 from the image-side surface of the first lens element to the object-side surface of the second lens element on the optical axis is 0.072 mm; a distance D23 from the image-side surface of the second lens element to the object-side surface of the third lens element on the optical axis is 0.167 mm; a distance D45 from the image-side surface of the fourth lens element to the object-side surface of the fifth lens element on the optical axis is 0.027 mm; an entrance pupil diameter EPD of the six-piece lens assembly for capturing images is 1.413 mm; a sum Σ(CT) of a central thickness of the six lens elements is 2.133 mm, a focal length f1 of the first lens element is 2.710 mm; a focal length f2 of the second lens element is −2.960 mm; a focal length f3 of the third lens element is 4.221 mm; a focal length f4 of the fourth lens element is 2.342 mm; a focal length f5 of the fifth lens element is 3.977 mm; a focal length f6 of the sixth lens element is −1.416 mm; an Abbe number of the first lens element vd1 is 55.7; an Abbe number of the second lens element vd2 is 22.4. TL/R1=1.772, D23/D45=6.166, OL/EPD=1.951, D12/f1=0.027, ΣCT/f=0.824, (R2−R3)/(R10+R11)=0.644, vd1−vd2=33.3, R5−R4=0.251.

TABLE 9

Basic lens element data of the fifth embodiment

| | Surface# | Curvature radius(mm) | Thickness (mm) | Index (Nd) | Abbe# (Vd) | Focal length (mm) |
|---|---|---|---|---|---|---|
| Aperture stop | | ∞ | −0.091 | | | |
| First lens element | First Surface | 2.166 | 0.472 | 1.535 | 55.7 | 2.710 |
| | Second Surface | −4.022 | 0.072 | | | |

TABLE 9-continued

Basic lens element data of the fifth embodiment

| | Surface# | Curvature radius(mm) | Thickness (mm) | Index (Nd) | Abbe# (Vd) | Focal length (mm) |
|---|---|---|---|---|---|---|
| Second lens element | Third Surface | 8.853 | 0.240 | 1.643 | 22.4 | −2.960 |
| | Fourth Surface | 1.544 | 0.167 | | | |
| Third lens element | Fifth Surface | 1.795 | 0.413 | 1.535 | 55.7 | 4.221 |
| | Sixth Surface | 8.130 | 0.313 | | | |
| Fourth lens element | Seventh Surface | −1.138 | 0.426 | 1.535 | 55.7 | 2.342 |
| | Eighth Surface | −0.673 | 0.027 | | | |
| Fifth lens element | Ninth Surface | 2.667 | 0.282 | 1.535 | 55.7 | 3.977 |
| | Tenth Surface | −10.000 | 0.046 | | | |
| Sixth lens element | Eleventh Surface | −10.000 | 0.300 | 1.535 | 55.7 | −1.416 |
| | Twelfth Surface | 0.826 | 0.300 | | | |
| Filter | Thirteen Surface | ∞ | 0.21 | 1.517 | 64.17 | |
| | Fourteenth Surface | ∞ | 0.57 | | | |

TABLE 10

Aspheric coefficients of the fifth embodiment

| Surface# | 1 | 2 | 3 | 4 | 5 | 6 |
|---|---|---|---|---|---|---|
| k | −22.0632 | 17.5580 | 1458.4591 | −10.8676 | −30.3944 | −220.4687 |
| A | 0.1951 | −0.0479 | −0.2009 | −0.2739 | 0.2434 | 0.0341 |
| B | −0.4143 | 0.5917 | 1.5356 | 1.7377 | −1.1689 | −0.1008 |
| C | 0.5244 | −2.3118 | −6.5753 | −5.8675 | 3.3869 | 0.1417 |
| D | −1.3090 | 2.7791 | 15.5715 | 11.4812 | −7.0143 | 0.0242 |
| E | 2.3783 | −0.5925 | −25.1751 | −14.4173 | 8.3445 | −0.9959 |
| F | −2.1717 | 0.0957 | 25.0681 | 10.7503 | −4.7295 | 1.1653 |
| G | −0.5193 | 0.0000 | −11.2183 | −3.5975 | 0.9655 | −0.3177 |
| H | 1.05190 | 0.0000 | 0.0000 | 0.0000 | 0.0000 | 0.0000 |
| J | 0.0000 | 0.0000 | 0.0000 | 0.0000 | 0.0000 | 0.0000 |

| Surface# | 7 | 8 | 9 | 10 | 11 | 12 |
|---|---|---|---|---|---|---|
| k | −0.1193 | −3.5561 | −16.9928 | 0.0000 | 0.0000 | −4.7923 |
| A | 0.2814 | −0.5438 | −0.1873 | −0.0459 | 0.1657 | −0.1258 |
| B | 0.1567 | 1.3621 | 0.3715 | 0.5279 | −0.2687 | 0.0578 |
| C | −1.2642 | −2.4879 | −0.2775 | −0.7670 | 0.1990 | −0.0222 |
| D | 5.8939 | 3.3457 | −0.0968 | 0.4464 | −0.0743 | 0.0091 |
| E | −10.9025 | −2.0513 | 0.1643 | −0.1175 | 0.0140 | −0.0033 |
| F | 8.9396 | 0.2217 | 0.0559 | 0.0116 | −0.0011 | 0.0007 |
| G | −2.8109 | 0.1418 | 0.0061 | 0.0000 | 0.0000 | −5.4609e−5 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 5B:
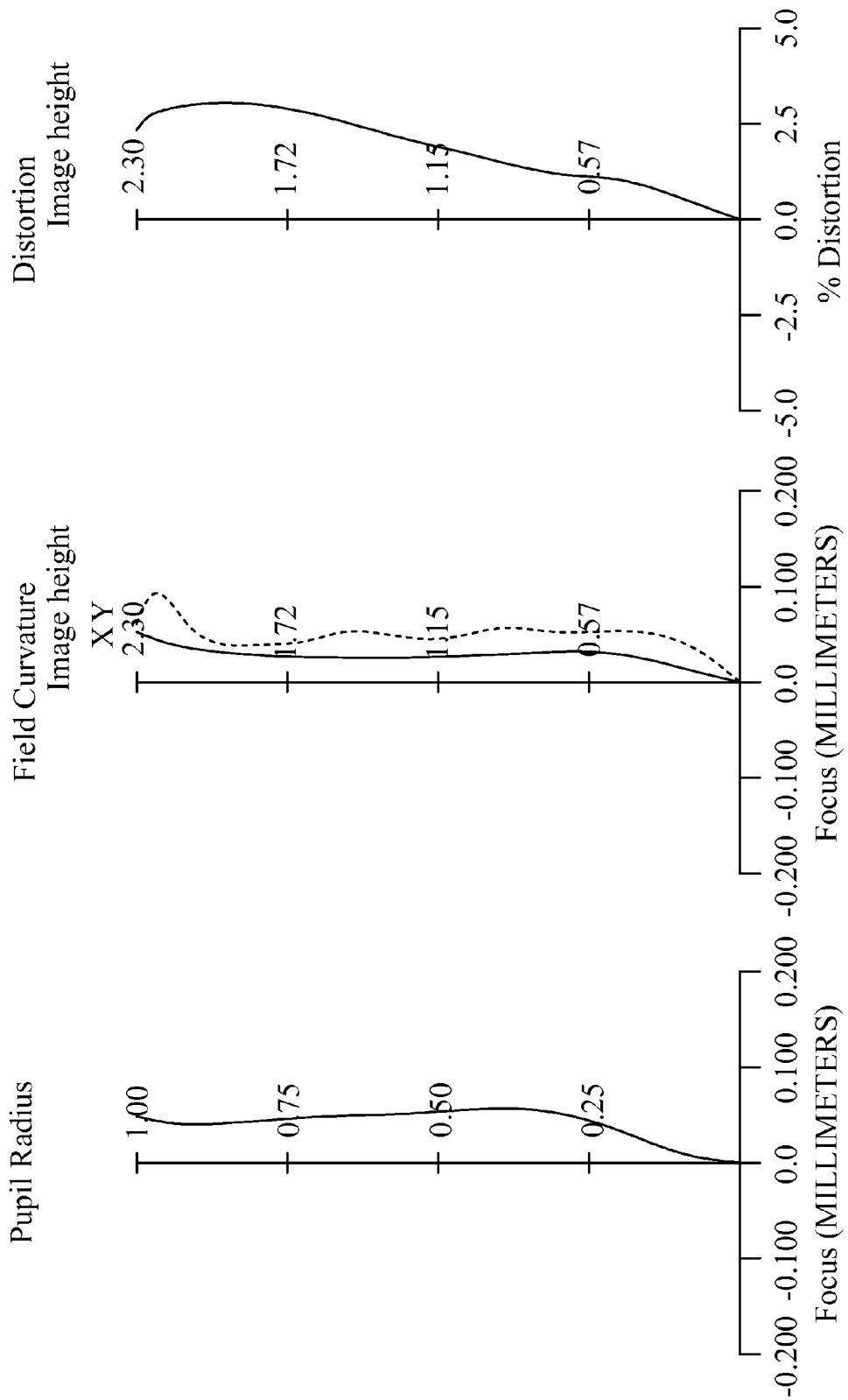
FIG. 5B is astigmatic field curves, a distortion curve and longitudinal spherical aberration curves of the fifth embodiment according to the present invention.

It can be found by the basic lens element data of table 9 along with the curve diagram of aberration of FIG. 5B that it has better compensation effect upon the astigmatic aberration, the distortion aberration and the longitudinal spherical aberration curves by the embodiment of the six-piece lens assembly for capturing images according to the present invention.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:
1. A six-piece lens assembly for capturing images, comprising:
an optical lens for capturing images, in order from an object-side toward an image-side along an optical axis comprising:
a first lens element with positive refractive power having a convex image-side surface near the optical axis;
a second lens element with negative refractive power having a convex object-side surface near the optical axis, and at least one of the object-side and an image-side surfaces of the second lens element being aspheric;
a third lens element with refractive power having a concave image-side surface near the optical axis, and at least one of an object-side and the image-side surfaces of the third lens element having at least one inflection point;
a fourth lens element with refractive power near the optical axis, and at least one of an object-side and an image-side surfaces of the fourth lens element being aspheric;
a fifth lens element having a convex image-side surface and a convex object-side surface near the optical axis, and at least one of the object-side and the image-side surfaces of the fifth lens element having at least one inflection point; and
a sixth lens element having a concave image-side surface and a concave object-side surface near the optical axis, and at least one of the object-side and the image-side surfaces of the sixth lens element having at least one inflection point;
an image-plane for imaging an object to be imaged; and
an aperture stop disposed between the object and the first lens element;
wherein a distance from the object-side surface of the first lens element to the image-side surface of the sixth lens element is OL, and an entrance pupil diameter of the six-piece lens assembly for capturing images is EPD, and the aforementioned parameters are satisfied with the following relationship: 1.5<OL/EPD<2.5, and an absolute value of a focal length of at least two of the six lens elements being less than 5 mm.

2. The six-piece lens assembly for capturing images of claim 1, wherein an Abbe number of the second lens element is vd2, and the following relationship is satisfied: vd2<=30.

3. The six-piece lens assembly for capturing images of claim 1, wherein a distance from the image-side surface of the second lens element to the object-side surface of the third lens element on the optical axis is D23, a distance from the image-side surface of the fourth lens element to the object-side surface of the fifth lens element on the optical axis is D45, and the following relationship is satisfied: 3.5<D23/D45<10.

4. The six-piece lens assembly for capturing images of claim 1, wherein a distance from the object-side surface of the first lens element to the image-plane on the optical axis is TL, a curvature radius of the object-side surface of the first lens element is R1, and the following relationship is satisfied: 1<TL/R1<2.5.

5. The six-piece lens assembly for capturing images of claim 1, wherein a distance from the image-side surface of the first lens element to the object-side surface of the second lens element on the optical axis is D12, a focal length of the first lens element is f1, and the following relationship is satisfied: 0.015<D12/f1<0.04.

6. The six-piece lens assembly for capturing images of claim 1, wherein a sum of a central thickness of the six lens elements is Σ(CT), a focal length of the optical lens for capturing images is f, and the following relationship is satisfied: 0.6<Σ(CT)/f<1.

7. The six-piece lens assembly for capturing images of claim 1, wherein a curvature radius of the image-side surface of the first lens element is R2, a curvature radius of the object-side surface of the second lens element is R3, a curvature radius of the image-side surface of the fifth lens element is R10, a curvature radius of the object-side surface of the sixth lens element is R11, and the following relationship is satisfied: 0.3<(R2−R3)/(R10+R11)<2.5.

8. The six-piece lens assembly for capturing images of claim 1, wherein an absolute value of a focal length of the first, third or sixth lens element is less than 5 mm.

9. The six-piece lens assembly for capturing images of claim 1, wherein the fourth, fifth and sixth lens elements are all made of plastic material.

10. A six-piece lens assembly for capturing images, comprising:
an optical lens for capturing images, in order from an object-side toward an image-side along an optical axis comprising:
a first lens element with positive refractive power having a convex image-side surface near the optical axis;
a second lens element with negative refractive power having a convex object-side surface near the optical axis, and at least one of the object-side and an image-side surfaces of the second lens element being aspheric;
a third lens element with positive refractive power having a concave image-side surface near the optical axis, and at least one of an object-side and the image-side surfaces of the third lens element having at least one inflection point;
a fourth lens element with refractive power near the optical axis, and at least one of an object-side and an image-side surfaces of the fourth lens element having at least one inflection point;

a fifth lens element with positive refractive power having a convex image-side surface and a convex object-side surface near the optical axis, and at least one of the object-side and the image-side surfaces of the fifth lens element having at least one inflection point; and
a sixth lens element with negative refractive power having a concave image-side surface and a concave object-side surface near the optical axis, and at least one of the object-side and the image-side surfaces of the sixth lens element having at least one inflection point;
an image-plane for imaging an object to be imaged; and
an aperture stop;
wherein an absolute value of a focal length of at least two of the six lens elements is less than 5 mm, a curvature radius of the image-side surface of the second lens element is R4, a curvature radius of the object-side surface of the third lens element is R5, and the aforementioned parameters are satisfied with the following relationship: R5−R4<0.5 mm.

11. The six-piece lens assembly for capturing images of claim 10, wherein an entrance pupil diameter of the six-piece lens assembly for capturing images is EPD, and the following relationship is satisfied: 1.2 mm<EPD<2.0 mm.

12. The six-piece lens assembly for capturing images of claim 10, wherein a distance from the object-side surface of the first lens element to the image-plane on the optical axis is TL, a curvature radius of the object-side surface of the first lens element is R1, and the following relationship is satisfied: 1<TL/R1<2.5.

13. The six-piece lens assembly for capturing images of claim 10, wherein a distance from the image-side surface of the first lens element to the object-side surface of the second lens element on the optical axis is D12, a focal length of the first lens element is f1, and the following relationship is satisfied: 0.015<D12/f1<0.04.

14. The six-piece lens assembly for capturing images of claim 10, wherein a sum of a central thickness of the six lens elements is Σ(CT), a focal length of the optical lens for capturing images is f, and the following relationship is satisfied: 0.6<Σ(CT)/f<1.

15. The six-piece lens assembly for capturing images of claim 10, wherein a curvature radius of the image-side surface of the first lens element is R2, a curvature radius of the object-side surface of the second lens element is R3, a curvature radius of the image-side surface of the fifth lens element is R10, a curvature radius of the object-side surface of the sixth lens element is R11, and the following relationship is satisfied: 0.3<(R2−R3)/(R10+R11)<2.5.

16. The six-piece lens assembly for capturing images of claim 10, wherein the third lens element has positive refractive power near the optical axis.

17. The six-piece lens assembly for capturing images of claim 10, wherein an absolute value of a focal length of the first, third or sixth lens element is less than 5 mm.

18. The six-piece lens assembly for capturing images of claim 10, wherein an Abbe number of the first lens element is vd1, an Abbe number of the second lens element is vd2, and the following relationship is satisfied: 25<vd1−vd2<35.

19. The six-piece lens assembly for capturing images of claim 10, wherein the aperture stop is disposed between the object and the first lens element.

* * * * *